(No Model.)
L. MAY.
VEHICLE WHEEL.
No. 260,491. Patented July 4, 1882.
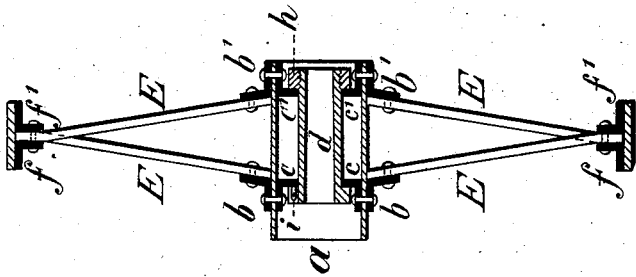
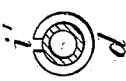
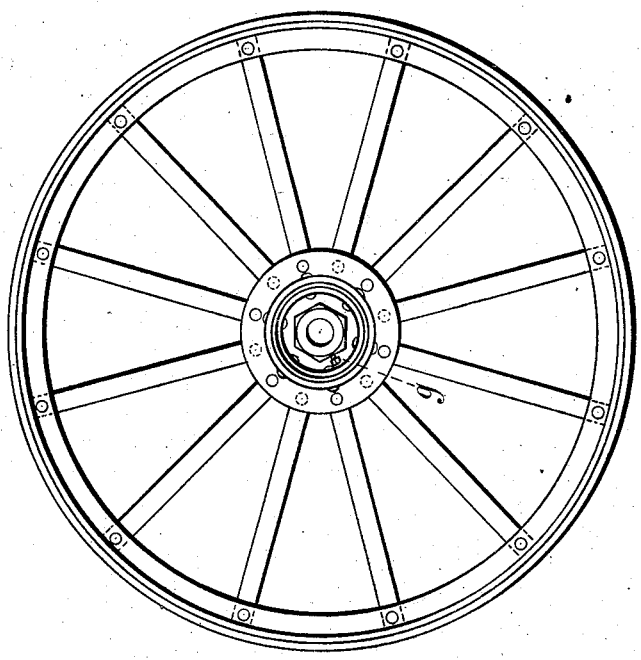

UNITED STATES PATENT OFFICE.

LEOPOLD MAŸ, OF UNGARISCH OSTRA, AUSTRIA-HUNGARY.

VEHICLE-WHEEL.

SPECIFICATION forming part of Letters Patent No. 260,491, dated July 4, 1882.

Application filed May 19, 1882. (No model.) Patented in England September 30, 1881, No. 4,220; in France September 30, 1881, No. 145,081; in Belgium September 30, 1881, No. 55,869; in Germany September 30, 1881, and in Austria-Hungary December 16, 1881, Nos. 46,103 and 32,406.

*To all whom it may concern:*

Be it known that I, LEOPOLD MAŸ, a resident of Ungarisch Ostra, in the Empire of Austria-Hungary, and a subject of the Emperor of Austria, have invented a certain Improvement in Wheels for Vehicles, of which the following is a specification.

This invention relates to metal wheels for vehicles, the naves of which wheels are made of wrought-iron, steel, or other malleable metal.

Referring to the accompanying drawings, Figure 1 is a side view; Fig. 2, a cross-section of a wheel constructed according to my invention, and Fig. 3 a section of the axle-box of said wheel.

$a$ is a tube of sheet-iron, upon the periphery of which, at the ends thereof, are riveted rings $b$ $b'$, made of angle-iron, and on the inside of the said tube $a$ are fixed two corresponding rings, $c$ $c'$, also made of angle-iron. The same rivets pass through the outer rings, $b$ $b'$, and the inner rings, $c$ $c'$, and also through the tube $a$, thereby preventing any rotation of the axle-box, a pin or stud, $i$, being provided on the ring $c$ or $c'$, which catches in a recess or notch, $i'$, in the axle-box $d$; or the said box may be provided with pins or the like, which catch in corresponding notches on the angle-iron ring, so that the axle-box cannot be moved or displaced in the wheel. The axle-box is provided at its front end with a screw-nut, $h$, and a suitable screw-thread, or is secured by any other suitable means. The replacing of a damaged axle-box is therefore easily and speedily effected.

The spokes E of the wheel are fixed in any known manner at one of their ends to the outer angle-iron rings, $b$ and $b'$, their other ends being secured between the two metal hoops $f$ and $f'$.

It is evident that the spokes may be placed in other ways than that shown in the annexed drawings. Instead of the angle-iron, other shapes of iron can be employed, and the wheels may be made without removable axle-boxes.

The tire of the wheel is fixed in any known manner to the two hoops, which are preferably made of angle-iron, but may be made of various shapes and of other malleable metal.

$g$ is a set-screw, which prevents the loosening of the nut securing the axle-box.

I claim—

1. In combination with tubular hub $a$ and angle-iron rings $c$ $c'$, the removable axle-box $d$, substantially as described.

2. In wheels for vehicles, the combination of the iron or metal tube $a$ with the iron or metal outer rings, $b$ $b'$, and inner rings, $c$ $c'$, essentially as and for the purpose described.

3. The axle-box $d$, notched flange $i$, and nut $h$, in combination with the tubular hub $a$ and angle-iron rings $c$ $c'$, secured to the said hub, and provided with the pin $i$, substantially as and for the purpose described.

In testimony whereof I have signed my name to this specification in the presence of two subscribing witnesses.

LEOPOLD MAŸ.

Witnesses:
 C. O. PAGET,
 E. G. S. ROELLER.